United States Patent [19]

Marmonier et al.

[11] 3,862,001

[45] Jan. 21, 1975

[54] HANDLING SYSTEM FOR A NUCLEAR REACTOR

[75] Inventors: Pierre Marmonier; Michel Sauvage, both of Aix-en-Provence, France

[73] Assignee: Commissariat a L'Energie Atomique, Paris, France

[22] Filed: Aug. 5, 1971

[21] Appl. No.: 169,348

[30] Foreign Application Priority Data
Aug. 14, 1970 France .............................. 70.30088

[52] U.S. Cl. .................... 176/87, 176/30, 220/29
[51] Int. Cl. ........................................... G21c 19/20
[58] Field of Search .................... 176/30, 31, 32, 87

[56] References Cited
UNITED STATES PATENTS

| | | | |
|---|---|---|---|
| 3,124,516 | 3/1964 | Flem et al. ............................ | 176/87 |
| 3,271,262 | 9/1966 | Hutchinson et al. ................... | 176/30 |
| 3,635,792 | 1/1972 | Barker ................................. | 176/32 |

FOREIGN PATENTS OR APPLICATIONS

| | | | |
|---|---|---|---|
| 921,770 | 3/1963 | Great Britain ......................... | 176/30 |
| 1,128,396 | 9/1968 | Great Britain ......................... | 176/30 |
| 1,086,552 | 10/1967 | Great Britain ......................... | 176/30 |

OTHER PUBLICATIONS

Problems in Nuclear Engineering, Vol. I, McLain et al., Method of Refueling Heterogeneous Nuclear Reactors, 1957, pages 267–277.

*Primary Examiner*—Benjamin R. Padgett
*Assistant Examiner*—P. K. Pavey
*Attorney, Agent, or Firm*—Cameron, Kerkam, Sutton, Stowell & Stowell

[57] ABSTRACT

The invention is concerned with a fuel element handling system for a nuclear reactor and comprises two rotary plugs which close the reactor vessel. The smaller rotary plug is mounted eccentrically within the larger plug which rotates relatively to the reactor wall. The smaller plug is rotatable relatively to the larger plug and supports at least one fuel element handling channel. Control rod passage mechanisms are distributed in the larger plug and in the smaller plug and a reactor core cover portion is rigidly connected to each of the plugs. The arrangement enables the dimensions of the vessel containing the core to be restricted to a diameter substantially the same as that of the core.

1 Claim, 2 Drawing Figures

PATENTED JAN 21 1975 3,862,001

HANDLING SYSTEM FOR A NUCLEAR REACTOR

In some present-day nuclear reactors, for example, fast neutron reactors, the fuel element handling system comprises two rotary plugs to close the reactor vessel. One of these plugs is fitted eccentrically inside the other plug and fuel handling channels extend through the smaller or inner plug so that simultaneous rotation of the two plugs and/or rotation of just the smaller plug enables the fuel elements to be brought into a position level with each of the reactor channels. The control rod drive and guide mechanisms, the reactor cover, thermocouples and other elements requiring to be moved are also supported by the smaller or inner plug. The smaller plug must therefore extend above all the reactor positions intended for the above-mentioned components, and more particularly above the channels intended for the control rods.

Since the two plugs must also be sufficiently eccentric to allow the handling channels to serve all the channels containing the fuel elements, the dimensions of the larger plug are necessarily very considerable. Sufficient space must also be provided inside the vessel surrounding the reactor core to permit rotation of the core cover and of the control rod mechanisms about the axis of the smaller plug.

When the nuclear reactor has only a relatively low power and the core channels are relatively close to one another and the core dimensions are relatively small, such a space can be left free without greatly increasing the size of the vessel. On the other hand, however, when the reactor is to be of a large size and of a high power, for example 1,000 MWe, the free space inside the vessel must be large so that the vessel has to have much larger dimensions than the core dimensions and there is a considerable waste of space and an unnecessary increase in the cost of the installation.

The object of this invention is to obviate this disadvantage by providing a handling system comprising two rotary plugs, whereby the dimensions of the vessel containing the core can be restricted to a diameter substantially the same as that of the core.

According to the invention there is provided a handling system comprising two rotary plugs for a nuclear reactor, comprising a large plug which rotates relatively to the reactor wall and, inside said plug, a smaller rotary plug which is eccentric relative to the first plug and which supports at least one fuel element handling channel, said system being characterised in that it comprises control rod passage mechanisms distributed in the large and in the smaller plug and a reactor core cover portion rigidly connected to each of said plugs.

The distribution of the control rod mechanisms in the two plugs enables the dimensions of the smaller plug to be greatly reduced thus reducing and even practically eliminating the need for a free space around the core for the passage of the control rod mechanisms during movement of the plugs. The width of the vessel can therefore be restricted to a value very close to that of the core.

The invention will now be described by way of example with reference to the accompanying drawings in which.

Figure 1:
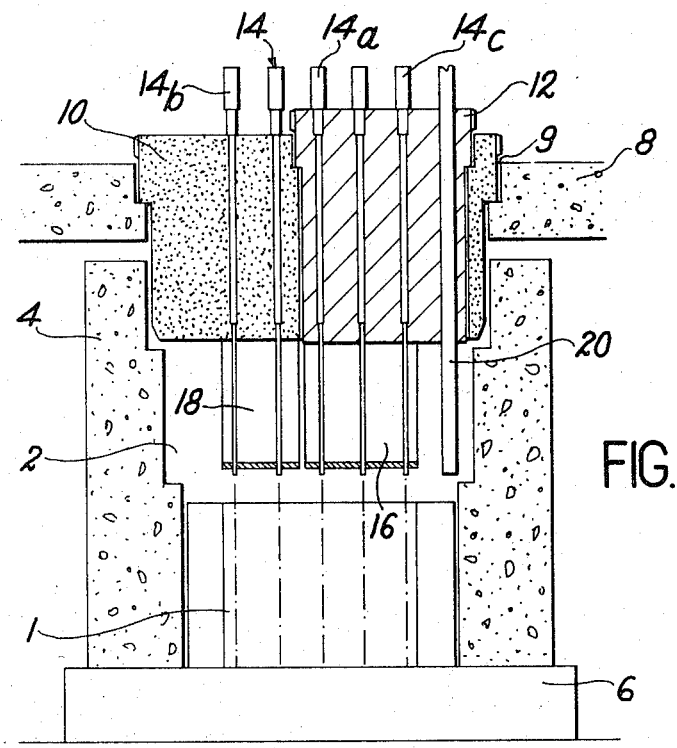
FIG. 1 is a diagrammatic longitudinal section of a nuclear reactor.
Figure 2:
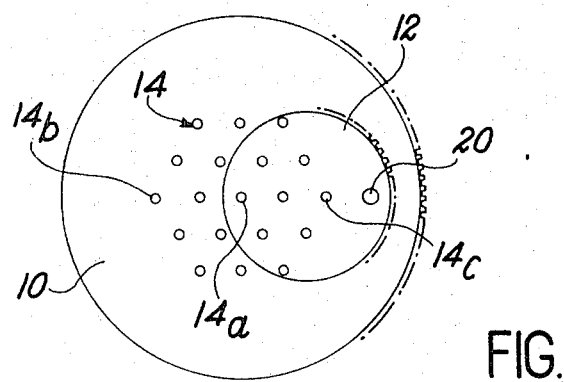
FIG. 2 is a top plan view of the rotary plugs of this reactor.

In the reactor shown in FIG. 1, the core 1 is enclosed inside a primary vessel 2 bounded by a cylindrical side wall 4 closed at the bottom by a base 6 and at the top by a slab 8 which supports two rotary plugs 10 and 12. The plug 10 is larger and is adapted to rotate relative to the slab 8 mounted in an orifice 9 therein. The plug 10 and the orifice 9 are coaxial with the core 1 and the reactor vessel 2. The plug 10 supports the second rotating plug 12 which is smaller and is eccentric in relation thereto and which can be rotated on its own by means not shown or be displaced together with the larger plug 10 on rotation of the latter.

A portion of the core cover 16 or 18 is secured to each of the plugs 10 and 12 and is adapted to rotate therewith.

Control rod guide mechanisms 14 also extend through the two plugs 10 and 12, and are uniformly distributed in the central part of the system that they form. These mechanisms 14 pass successively through the plug 10 or 12 and then through a portion of the core cover 16 or 18 and open above the channels in the core 1 so as to allow the control rods to drop into the core or be lifted towards a control system disposed outside the plugs.

The smaller plug 12 also supports a fuel element handling channel 20 which is displaced by the simultaneous rotation of the two plugs 10 and 12 or by rotation of the plug 12 on its own, so that said channel is successively brought into register with each of the channels containing the fuel elements in the core 1. During this rotation, the control rod mechanisms are also displaced inside the vessel 2.

By way of example in the embodiment illustrated, in which the smaller plug has a diameter of practically half the diameter of the larger plug, the end mechanism 14a after one half-revolution about the axis of the plug 12 which rotates on its own, will substantially occupy the position of channel 20 shown in FIG. 1, level with a peripheral point of the core 1. Similarly, a half-revolution of the plug assembly 10 and 12 about the axis of the plug 10 displaces the mechanism 14b situated in the plug 10 at the left-hand end in FIG. 1 and brings it to a point corresponding substantially to the position of the mechanism 14c farthest to the right in the plug 12. These two end mechanisms 14a and 14b therefore remain above the reactor core channels irrespective of the position of the plugs. The same applies to the other mechanisms 14.

The wall 4 of the vessel 2 can therefore have an internal dimension very close to the dimension of its bottom part, above the core 1, and this effect is achieved by the distribution of the mechanisms in the two plugs.

The diameter of the plug 12 is in fact much less than that of known reactors in which it has to support the control rod mechanism assembly. The path of each of these mechanisms is thus reduced and no longer extends to points very much outside the reactor core 1. The plug 10 may also be smaller and hence correspond to a smaller entry orifice 9 in the vessel. The dead space above the core is therefore practically eliminated.

In the case of a high-power reactor, the spacing of the control rod mechanisms is such that the junction of the two plugs and of the two core cover portions can readily be provided between two adjacent mechanisms. The fuel element assemblies are also spaced farther apart as a result of the increase in the core diameter, and this facilitates the relative displacements of the two plugs.

We claim:

1. A handling system for a nuclear reactor having a reactor wall with an open top comprising two rotary plugs including a large plug which rotates relatively to the reactor wall closing the open top and, mounted in said large plug, a smaller rotary plug which is eccentric relative to said large plug and at least one fuel handling channel supported by said smaller plug, control rod passage mechanisms distributed in said large plug and in said smaller plug and a reactor core cover portion rigidly connected beneath each of said plugs within said wall, said control rod mechanisms being uniformly distributed in the assembly of said plugs and the diameter of said small plug being substantially half the diameter of said large plug.

* * * * *